United States Patent [19]
Lavelle et al.

[11] Patent Number: 5,862,150
[45] Date of Patent: Jan. 19, 1999

[54] VIDEO FRAME SIGNATURE CAPTURE

[75] Inventors: Michael G. Lavelle, Saratoga; Alex N. Koltzoff, Sausalito; David C. Kehlet, Sunnyvale, all of Calif.

[73] Assignee: Sun Microsystems, Inc., Mountain View, Calif.

[21] Appl. No.: 963,261

[22] Filed: Oct. 28, 1997

Related U.S. Application Data

[63] Continuation of Ser. No. 408,264, Mar. 21, 1995, abandoned.
[51] Int. Cl.[6] ...................................................... G06F 15/20
[52] U.S. Cl. .......................................... 371/22.4; 345/507
[58] Field of Search ..................................... 345/213, 507, 345/515, 513, 198; 371/21.1, 22.4

[56] References Cited

U.S. PATENT DOCUMENTS

| | | | |
|---|---|---|---|
| 5,050,102 | 9/1991 | Sun et al. ................................. | 345/122 |
| 5,293,474 | 3/1994 | Patil et al. ............................... | 707/518 |
| 5,410,547 | 4/1995 | Drain ...................................... | 371/22.1 |
| 5,528,602 | 6/1996 | West et al. .............................. | 371/21.1 |
| 5,539,428 | 7/1996 | Bril et al. ................................. | 345/143 |

*Primary Examiner*—Kee M. Tung
*Attorney, Agent, or Firm*—Blakely Sokoloff Taylor & Zafman

[57] ABSTRACT

A method and apparatus for performing signature analysis of video data being output by a RAMDAC so that starting and stopping the sampling of data is made precise so that the data sampled is a known set. The invention uses a timing generator and signature analysis hardware integrated with a RAMDAC to start and stop the sampling and signature calculation of video data on frame boundaries. A signature capture request bit is used to request that the next frame be sampled and a signature calculated. The hardware waits until the beginning of the next frame starts, and then samples data until the frame ends. The calculated signature is made available in a signature analysis result register for reading. The resulting signature is held in the signature analysis result register until cleared or another signature capture request is made.

8 Claims, 3 Drawing Sheets

VIDEO FRAME SIGNATURE CAPTURE

This is a continuation of application Ser. No. 08/408,264 filed Mar. 21, 1995 now abandoned.

BACKGROUND OF THE INVENTION

1. Field of the Invention

This invention relates to computer systems and, more particularly, to a RAMDAC (random access memory-digital-to-analog converter) used to transfer and process data from a frame buffer to an output display device.

2. History of the Prior Art

One of the significant problems involved in increasing the operational speed of desktop computers has been in finding ways to increase the rate at which information is transferred to an output display device. Many of the various forms of data presentation which are presently available require that large amounts of data be transferred. For example, if a computer output display monitor is operating in a color mode in which 1280×1024 pixels are displayed on the screen at once and the mode is one in which thirty-two bits are used to define each pixel, then a total of over forty million bits of information must be transferred to the screen with each individual picture (called a "frame"} that is displayed. Typically, sixty frames are displayed each second so that over one and one-half billion bits must be transferred each second in such a system. This requires a very substantial amount of processing power.

In order to provide such a large amount of information to an output display device, computer systems typically utilize a frame buffer which holds the pixel data which is to be displayed on the output display.

Typically a frame buffer offers a sufficient amount of random access memory to store one frame of data to be displayed. The information in the frame buffer is transferred to the display from the frame buffer sixty or more times each second. After (or during) each transfer, the pixel data in the frame buffer is updated with the new information to be displayed in the next frame.

In DRAM frame buffers, pixel data may be read from the same port as data is written. VRAM frame buffers add a separate video data port so that the main pixel port remains free for rendering. Two-ported video random access memory (VRAM) or frame buffer random access memory (FBRAM) has been substituted for dynamic random access memory so that information may be transferred from the frame buffer to the display at the same time other information is being loaded into the frame buffer.

The data from the frame buffer is input to circuitry which converts the data from the frame buffer memory to a form usable by the output display device. FIG. 1 shows a computer system in which the present invention may be utilized where data in a memory 11 from a host CPU 12 is placed on host bus 13 and passed by rendering controller 14 to the frame buffer memory (shown as VRAMs 15a–15d, which may also be FBRAMs). A RAMDAC 21 is coupled to the host bus through the rendering controller and to the frame buffer memories and includes a look-up table (or LUT which is the RAM part of the RAMDAC) and other elements for translating 16 bit data from the frame buffer memory to a 64 or 128 bit digital RGB signal which is converted by a digital to analog converter (DAC) to three analog signals representing voltage levels for red, blue and green which when combined at a pixel location in monitor 25 create a desired color at that pixel. The particulars of the frame buffer memory, rendering controller and monitor components are well known in the art and will not be described herein except as necessary for a proper understanding of the invention. In this connection, for the most part, the present invention is directed to certain improvements to RAMDAC 21 which provide the enhanced capabilities of the invention.

SUMMARY OF THE INVENTION

Signature analysis is a well known method of hardware testing. It involves calculating a signature of a set of data, usually after this data has passed through some hardware under test. By comparing the actual signature with a known golden signature, a pass/fail determination of the hardware under test can be made.

At least one part exists, the Brooktree Bt 467, prior to this invention, that incorporates signature analysis on a pixel data stream.

A key problem to be solved with signature analysis is starting and stopping the sampling of data so that the data sampled is a known set. A useful set of data is known to those skilled in the relevant the art as a video frame, or just frame.

Attempts have been made in the past on the Bt 467 to use software to control starting and stopping data sampling. This software technique has had problems with consistent results on the same hardware, due to timing imprecisions at start and stop.

This invention uses a timing generator and signature analysis hardware integrated with a RAMDAC to start and stop the sampling and signature calculation of video data on frame boundaries. This invention utilizes prior art techniques of sampling video data only during unblanked video time intervals, as well as the prior art techniques for calculating the signature which is in the nature of a checksum.

A signature capture request bit is used to request that the next frame be sampled and a signature calculated. The hardware waits until the beginning of the next frame starts, and then samples data until the frame ends. The calculated signature is made available in a signature analysis result register for reading. The resulting signature is held in the signature analysis result register until cleared or another signature capture request is made.

This invention handles both non-interlaced frames and interlaced frames. A non-interlaced frame consists of a single sequential scanline field of video data. A non-interlaced frame is the same as a non-interlaced field. An interlaced frame consists of two fields of video data, the even field and the odd field. Each field contains every other line of video data comprising the frame. Both interlaced and non-interlaced operations are very well known and practiced.

Two techniques are provided for handling non-interlaced and interlaced frames. The first is to capture two fields of video data, regardless of video mode. This then captures two frames in non-interlaced mode, and one frame in interlaced mode. The invention provides for designating fields odd or even regardless of video mode, and starting the capture on the even field. This is necessary to get a repeatable result in interlaced mode, although the selection of even vs. odd as the starting field is arbitrary.

Another technique is to capture a single field if in non-interlaced mode, and two fields if in interlaced mode. When the video format is interlaced and the signature capture request bit is set, the invention waits until the next field to begin sampling. Sampling ends at the end of the field. Within this field, sampling and signature generation only occurs during unblanked (visible) time intervals of each scan line.

In interlaced mode the fields are designated even or odd. When the video format is interlaced and the signature capture request bit is set, the hardware waits until the next even field to begin sampling. Sampling ends at the end of the odd field. Within each field, sampling and signature generation only occurs during unblanked (visible) time intervals of each scan line.

DETAILED DESCRIPTION OF THE INVENTION

Figure 1:
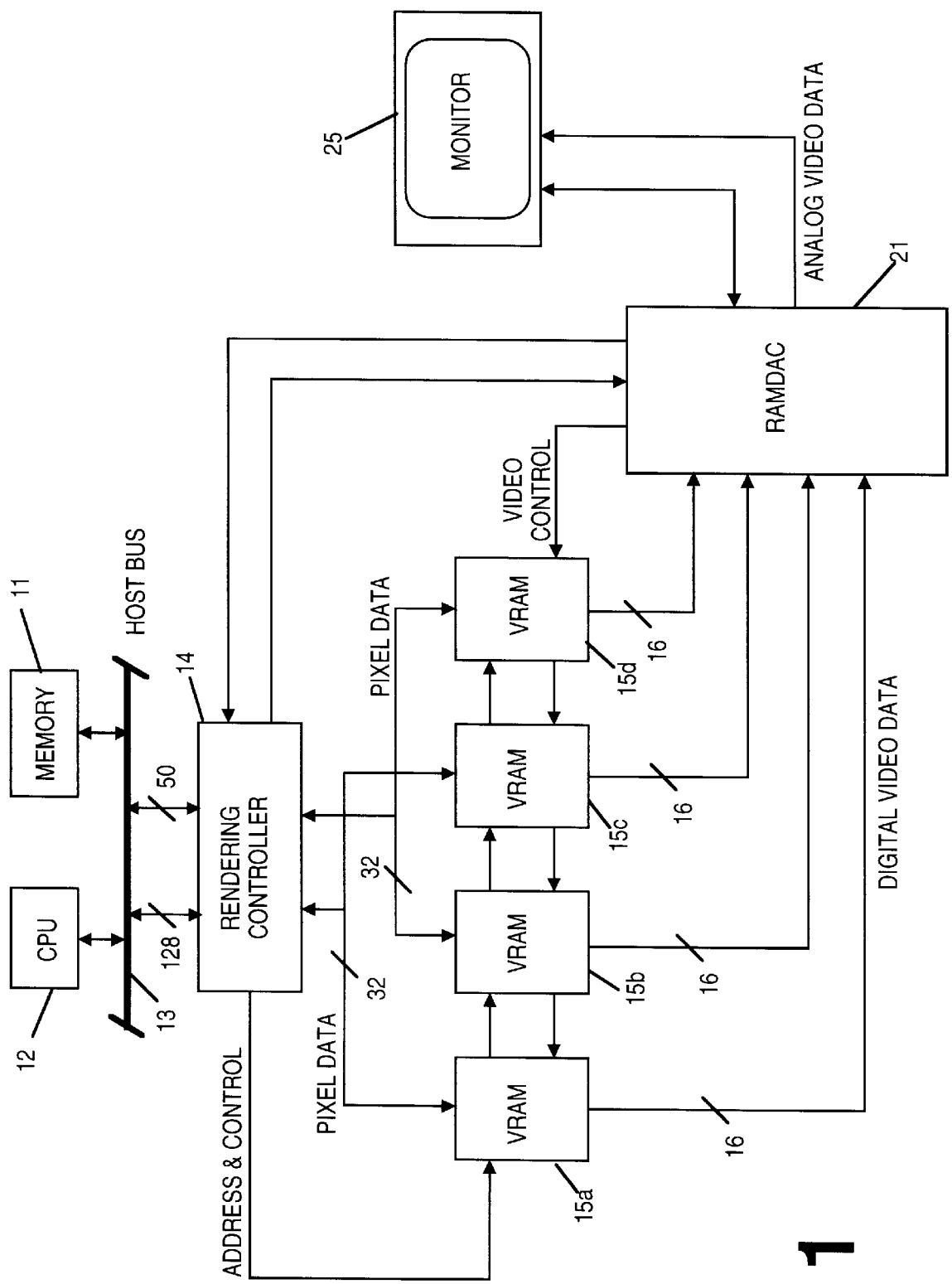
FIG. 1 is a block diagram showing a system in which the present invention may be utilized.
Figure 2:
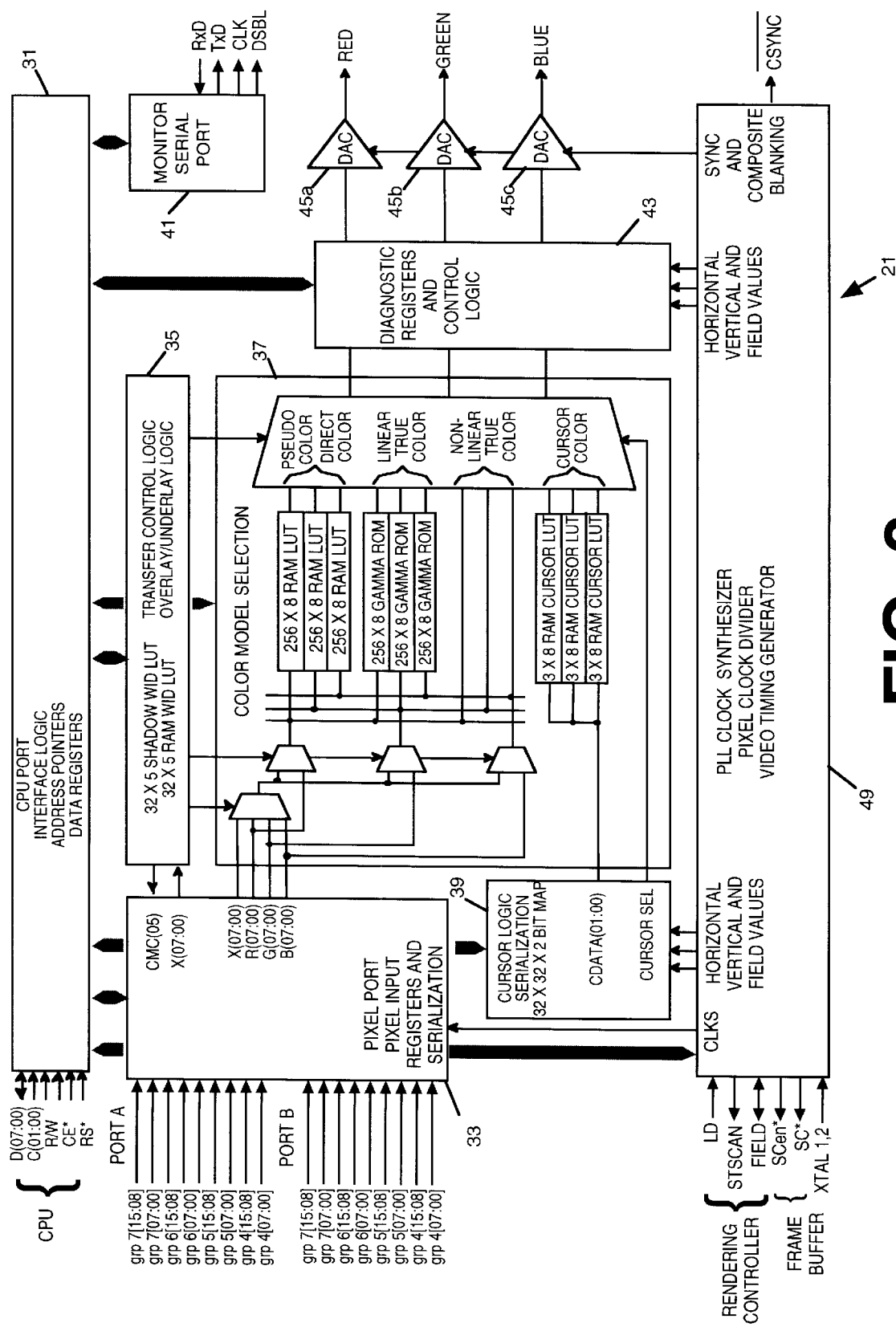
FIG. 2 is a detailed block diagram of a RAMDAC which employs the invented signature analysis hardware.

FIG. 2 shows the components of a RAMDAC 21 which can be utilized to implement the present invention. The RAMDAC includes several functional blocks as follows: CPU port, interface logic, address pointers and data registers 31, pixel port, pixel input registers and serialization 33, shadow and RAM look-up tables, transfer control and overlay, underlay logic 35, color model selection 37, cursor logic serialization 39, monitor serial port 41, diagnostic registers and control logic 43, digital-analog converters (DAC) 45a–45c and PLL clock synthesizer, pixel clock divider and video timing generator 49. The invention lies mainly in an implementation of the video timing generator component of PLL clock synthesizer, pixel clock divider and video timing generator 49 which generates horizontal and vertical field values which are which are integrated with and input to diagnostic registers and control logic 43 to generate a video frame signature. Therefore, the following description will be limited to the video timing generator component of PLL clock synthesizer, pixel clock divider and video timing generator 49 and diagnostic registers and control logic 43, with information pertaining to the other components of the RAMDAC provided only as needed for an understanding of the present invention. Although the other components shown in FIG. 2 may vary between RAMDACs of different manufacturers, persons skilled in the relevant art will recognize these various components and know how they or their equivalents may be implemented.

Frame buffer data is provided to the pixel port as pixel port signals such that the pixel inputs are divided into two ports, labeled A and B which consist of four groups per port. Furthermore, each group is divided into an upper byte and a lower byte. Thus, the pixel port comprises a total of 128 pixel bits contained in groups 0 through 7. Table 1 illustrates these assignments.

TABLE 1

Pixel Port Naming Convention

| Pixel Port | Group | Group Bits | Device Bits |
|---|---|---|---|
| B | 7 | [15:8] | PB(63-56) |
|  |  | [7:0] | PB(55-48) |
|  | 6 | [15:8] | PB(47-40) |
|  |  | [7:0] | PB(39-32) |
|  | 5 | [15:8] | PB(31-24) |
|  |  | [7:0] | PB(23-16) |
|  | 4 | [15:8] | PB(15-08) |
|  |  | [7:0] | PB(07-00) |
| A | 3 | [15:8] | PA(63-56) |
|  |  | [7:0] | PA(55-48) |
|  | 2 | [15:8] | PA(47-40) |
|  |  | [[7:0] | PA(39-32) |
|  | 1 | [15:8] | PA(31-24) |
|  |  | [7:0] | PA(23-16) |
|  | 0 | [15:8] | PA(15-08) |
|  |  | [[7:0] | PA(07-00) |

However, the specifics of the manner in which the frame buffer pixel data is provided to the pixel port of the RAMDAC may vary and is not critical to an understanding of the invention.

SIGNATURE ANALYSIS

RAMDAC 21 incorporates a signature analysis mechanism for aiding system level diagnostics. Signature analysis may be performed on a frame of digital pixel data at a point immediately prior to analog conversion. The number of pixels to be captured is a full frame.

The signature analysis logic is controlled via a signature analysis control register which is described with reference to Table 2. Software first writes a seed value to this register before requesting signature capture (via bit 25) and later reads a signature result after signature analysis is complete (bit 26 changes from "busy" to "idle").

TABLE 2

Signature Analysis Control Register

| Bit(s) | Field | R/W | Reset Value | Description |
|---|---|---|---|---|
| 31–28 | Reserved | R/O | 0 | Reserved, this field will always read back as zero |
| 27 | Data-Strobe Mode<br>(0) Signature Analysis Mode<br>(1) Data Strobe Mode | R/W | 0 | This bit determines the method of high-speed test used. The signature analysis registers are used to hold the test result for both test methods. |
| 26 | Signature Analysis Busy<br>(0) Idle<br>(1) Busy | R/O | 0 | Status of signature analysis logic. A logical zero indicates that the signature analysis has completed the previous |

TABLE 2-continued

Signature Analysis Control Register

| Bit(s) | Field | R/W | Reset Value | Description |
|---|---|---|---|---|
| | | | | signature acquisition. A logical one indicates that a requested signature acquisition has been requested, but not completed. |
| 25 | Signature Capture Request | W/O | — | Writing a one causes the signature analysis logic to become busy and requests that the signature analysis logic capture a signature over the next frame of displayable pixel data. The data written into bits 24–0 will be used as the seed for signature acquisition for the frame. Writing a zero cancels any previously requested signature acquisition. |
| 24–0 | Signature Analysis Seed/Result | R/W | — | 25 bit signature analysis seed value (W) or result value (R); 1 bit (bit 24) recirculation, 8 bits (bits 23:16) blue pixel signature 8 bits (bits 15:8) green pixel signature 8 bits (bits 15:8) red pixel signature |

SIGNATURE REGISTER

When enabled, the output signature analysis registers (SARS) operate with the 24 bits of data that are presented to the DAC inputs. These 24-bit vectors represent a single pixel color, and are presented as inputs simultaneously to the red, green, and blue SARS, as well as the three on-chip DACs. They are presented each pixel clock except during horizontal blanking or vertical blanking.

Figure 3:
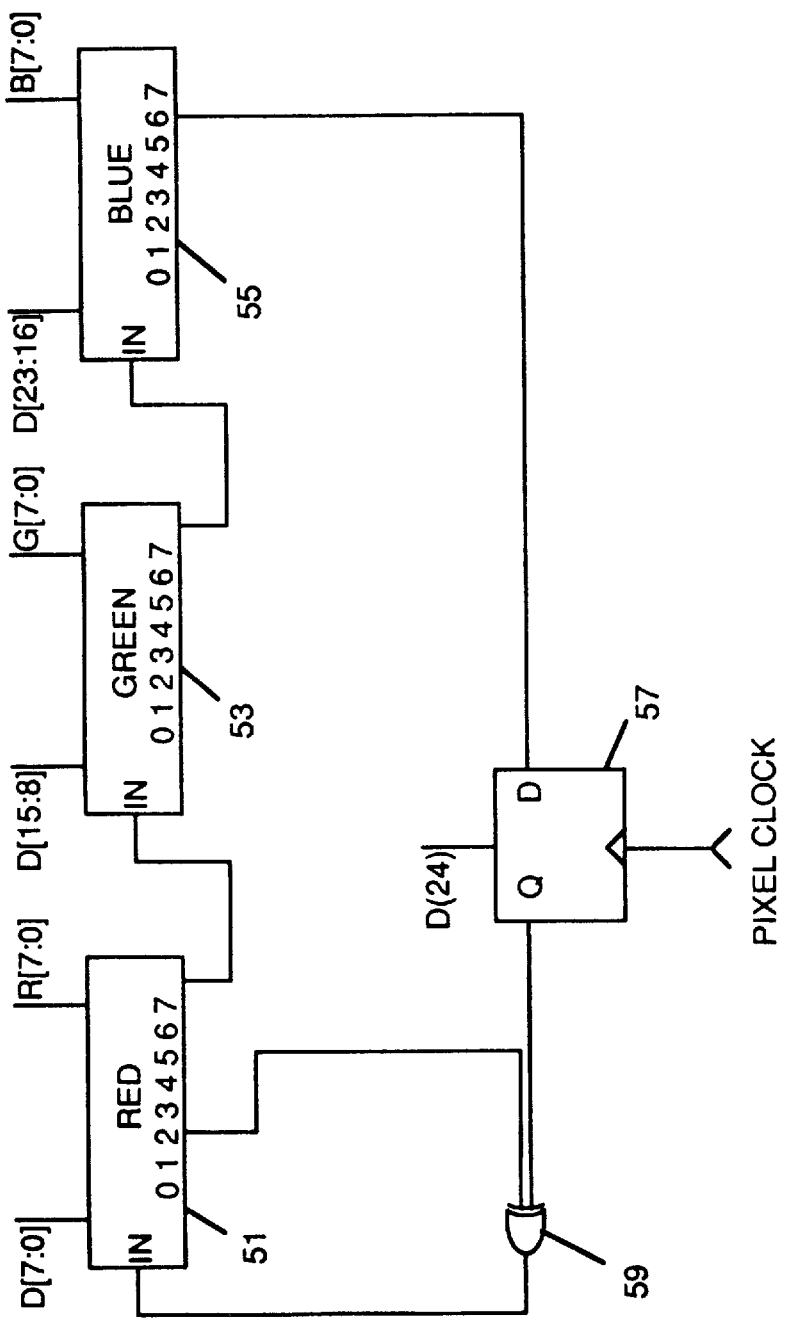
FIG. 3 shows an implementation of a shift register used by the invented signature analysis hardware.

The three 8 bit SARs (red, green, blue) plus one extra 'recirculation' bit act as a 25 bit wide linear feedback shift register. As shown in FIG. 3, the three SARs 51, 53 and 55 with flip-flop 57 form the 25 bit wide linear shift register which shifts once for each unblanked pixel clock in one frame. For each shift, the current red, blue and green SAR values are shifted right to the next higher bit and are XORed with the red, blue and green pixel values to form the new SAR values. The output of flip-flop 57 is XORed with bit 2 of register 51 by XOR gate 59 to form the input to the shift register. Registers 51, 53 and 55 are initialized with a seed value for a particular image being used for the test. After all the pixels of the image have been processed by the shift register, the 24 bit result in registers 51, 53 and 55 forms a relatively unique signature which is compared with a signature produced by a system known to be "good." If the produced signature is equal to the "good" signature then the system under test is in proper working order.

Diagnostic software can use the signature analysis hardware to check that all of the pixels in a frame containing a known image have been correctly processed by the rendering controller, frame buffer and RAMDAC logic. After drawing a known image into the frame buffer, software asserts the signature capture "request" bit (signature analysis control register bit 25) to cause the RAMDAC signature analysis hardware to generate the signature for the image as it is scanned out of the frame buffer and into the digital-to-analog converters. Each different known image has a (nearly) unique signature, or 'fingerprint'. As noted above, these signatures can be collected on a "known good" system, or predicted by simulation. Once determined, the "good" signatures can be used to test for the proper operation of manufactured copies of the system to ensure that the manufactured copies do not have defective parts. The signatures can also be used after a system has been installed as a diagnostic aid.

Upon assertion of the signature capture "request" bit (bit 25), the signature analysis "busy" bit (bit 26) goes to the "busy" state and the signature analysis hardware monitors the state of the video timing generator 49 and waits for the beginning of the next frame. When the video timing generator indicates the start of the next frame, the signature analysis hardware is enabled so that signature analysis starts with the first pixel of the frame. Analysis is only enabled for the visible pixels in that frame (i.e., analysis is disabled when the video timing generator indicates horizontal and vertical blanking). Signature analysis is complete when the video timing generator indicates that the last pixel of the frame has been analyzed. Upon completion, the signature analysis "busy" bit (bit 26) goes to the "idle" state.

Diagnostic software may poll the busy bit for the "idle" condition to determine that the signature analysis request has been completed; upon completion, the diagnostic software may then read the signature analysis result (bits 24-0) and compare the signature result with the expected signature for the image in the frame buffer.

By utilizing this invention, each pixel of the frame contributes exactly once to the signature, and the contributions are in the correct raster scan order. This produces a deterministic signature for the image displayed in that frame, which can be used to detect and diagnose failures in the rendering controller 14, the VRAMs 15a–15d, the RAMDAC 21 digital logic and the interconnections among these parts. In almost all cases, the signature collected by the signature analysis hardware will not match the known good/predicted signature if even one bit in one pixel out of a million pixel image is incorrectly processed.

This signature can be used to simply detect failures, or may be further used to isolate failures. Isolation to particular frame buffer interleaves or channels can be performed by using test images which only stress one interleave or channel per test, and using the signature analyzer to determine which tests pass and which tests fail.

The present invention utilizes a programmable timing generator to provide the pixel clock and horizontal and vertical blanking signals, with the vertical blanking signal indicating start of frame and end of frame as is well known in the art, which signals are used by the signature analysis hardware to process the signature as explained above. A suitable timing generator for this purpose is described in co-pending application Ser. No. 08/408,268 filed Mar. 21, 1995, although the specifics of the design in the co-pending application are not necessary for an understanding of the present invention since any timing generator which produces horizontal and vertical blanking signals, and start of frame and end of frame, all of which are well known in the art, including their generation for a particular system, will enable the signature analysis hardware of the present invention to properly operate.

By having the signature analysis hardware and the video timing signal generator integrated with the other components of the RAMDAC, it becomes possible to start and stop the sampling and signature calculation of video data on precise on frame boundaries to thereby overcome problems resulting from timing imprecisions at start and stop.

We claim:

1. An apparatus for performing signature analysis on video data comprising:
   a RAMDAC for coupling to a source of digital video information and a display monitor, said RAMDAC integrated with a signature analysis circuit and a video timing signal generator which generates horizontal and vertical blanking signals, said signature analysis circuit adapted to process a frame of video data within its frame boundaries exclusive of data present during each of horizontal and vertical blanking periods as determined by said horizontal and vertical blanking signals to produce a deterministic signature for said video data within said frame.

2. The apparatus defined by claim 1 wherein said signature analysis circuit comprises:
   a) a first signature address register for storing a red component of a signature address;
   b) a second signature address register for storing a green component of a signature address, said second signature address register coupled to said first signature address register;
   c) a third signature address register for storing a blue component of a signature address, said third signature address register coupled to said second signature address register;
   d) a flip-flop coupled to said third signature address register;
   e) an XOR gate coupled to said flip-flop and said first signature address register;
   said three registers and said flip-flop forming a 25 bit wide linear feedback shift register which shifts once for each unblanked pixel clock in one video frame wherein for each shift, current red, blue and green signature address register values are shifted right to a next higher bit and are XORed with red, blue and green pixel values of a pixel in a current video frame to form new signature address register values.

3. The apparatus defined by claim 2 wherein the output of said flip-flop is XORed with a predetermined bit of said first signature address register by said XOR gate to form the input to the first signature address register.

4. The apparatus defined by claim 2 wherein said first, second and third signature address registers are initialized with a seed value for a particular image being used for a test such that after all the pixels of the image have been processed by the shift register, the result in said first, second and third signature address registers forms a relatively unique signature which is compared with a signature produced by a system known to be correct.

5. A method for performing signature analysis on video data comprising the steps of:
   a) generating horizontal and vertical blanking signals indicating the presence of horizontal and vertical blanking periods and a start signal and a stop signal indicating, respectively, the start of a video frame and the end of the video frame;
   b) receiving said start signal and processing a frame of video data within its frame boundaries exclusive of data present during each of said horizontal and vertical blanking periods to produce a deterministic signature for said video data within said frame until receipt of said stop signal.

6. The method defined by claim 5 wherein said receiving and processing step comprises the steps of:
   a) storing a red component of a signature address in a first signature address register;
   b) storing a green component of a signature address in a second signature address register;
   c) storing a blue component of a signature address in a third signature address register;
   d) a flip-flop coupled to said third signature address register;
   e) forming a 25 bit wide linear feedback shift register using said three registers and a flip-flop; and
   f) shifting said shift register once for each unblanked pixel clock in one video frame wherein for each shift, current red, blue and green signature address register values are shifted right to a next higher bit and are XORed with red, blue and green pixel values of a pixel in a current video frame to form new signature address register values.

7. The method defined by claim 6 further comprising the step of XORing the output of said flip-flop with a predetermined bit of said first signature address register to form the input to the first signature address register.

8. The method defined by claim 6 further comprising the steps of:
   initializing said first, second and third signature address registers with a seed value for a particular image being used for a test;
   comparing the result in said first, second and third signature address registers after all the pixels of the image have been processed by the shift register with a signature produced by a system known to be correct.

* * * * *